May 12, 1970  R. KUTSMICHEL  3,511,290

TIRES

Filed Aug. 30, 1966

RUDOLF KUTSMICHEL
INVENTOR

By Rauber & Lazar
HIS ATTORNEYS

United States Patent Office 3,511,290
Patented May 12, 1970

3,511,290
TIRES
Rudolf Kutsmichel, Langendiebach uber Hanau, Germany, assignor to The Dunlop Company Limited, London, England, a British company
Filed Aug. 30, 1966, Ser. No. 576,024
Claims priority, application Germany, Sept. 7, 1965,
D 48,144
Int. Cl. B60c 11/12, 7/24
U.S. Cl. 152—209                              16 Claims

ABSTRACT OF THE DISCLOSURE

A vehicle tire having a tread comprising generally circumferential ribs and grooves, the ribs being provided with slots extending radially inwardly from the ground-contacting surface of the rib and generally transversely of the rib, each slot having a channel at its radially inner end, the radial relative movement between the opposed walls of each slot being substantially reduced by interengaging regions between the walls of the slots.

This inventions relates to a vehicle tire.

According to the invention there is provided a vehicle tire having a tread portion comprising at least one generally circumferential rib and a generally circumferential groove on at least one side thereof, the rib having a plurality of slots formed therein which extend radially inwardly from the ground-contacting surface of the rib and generally transversely thereof, the opposed sidewalls of each slot being interengaged with one another in such manner that relative movement between said walls is substantially prevented in a direction radially of the tire.

In one example of the above, each of said opposed sidewalls of each slot is provided with one or more projections extending outwardly therefrom, each projection of one of said walls being in co-operative engagement with a corresponding projection on the other wall. Each projection may extend the full length of the sidewall of the slot and be formed with substantially parallel side faces for engagement with the side faces of a co-operating projection, said parallel side faces lying substantially normal to the mid-circumferential plane of the tire. Alternatively said projections may comprise a plurality of diamond-shaped facets formed on each of said opposed sidewalls.

In an alternative construction the opposed sidewalls of each slot are bonded together at one or more positions to prevent said relative radial movement between said walls.

In any of the above constructions the radially-innermost extremities at least some of the slots are of enlarged transverse cross-sectional form to define a channel extending to the groove.

Figure 1:
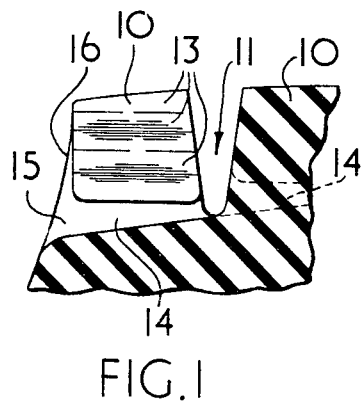
Figure 2:
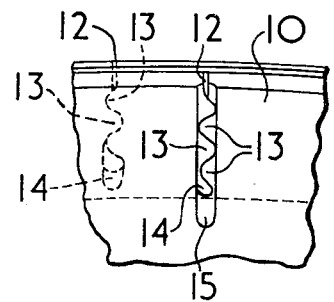
Figure 3:
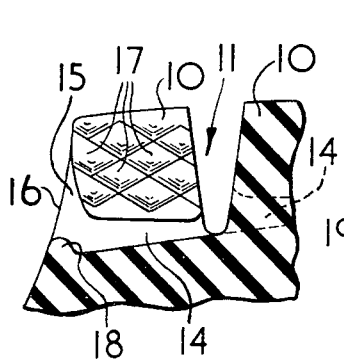
Figure 4:
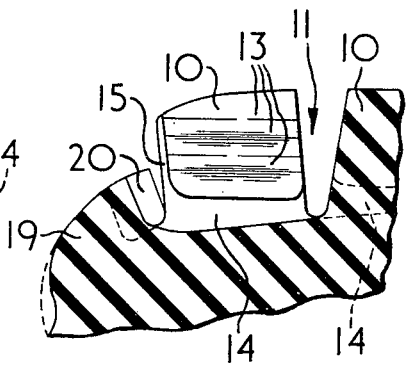

Embodiments of the invention will now be described in more detail with reference to the accompanying drawings wherein, FIG. 1 is an axial cross-sectional view in the shoulder region of a part of a tire constructed in accordance with the invention, FIG. 2 is an end view of that part of the tire shown in FIG. 1, FIG. 3 is an axial cross-sectional view in the shoulder region of a part of a modified construction of a tire, and FIG. 4 is an axial cross-sectional view in the shoulder region of a part of another modified construction of tire.

Referring to FIGS. 1 and 2 of the drawings there is shown a vehicle tire having a tread portion comprising a plurality of generally circumferential ribs 10 separated by generally circumferential grooves 11, the grooves being formed one at each side of the ribs except in the case of the axially-outermost ribs where a groove is formed only at the axially-inner side thereof. The axially-outer side of each of the axially-outermost ribs forms part of the outer sidewall region of the tire in the shoulder region thereof.

A plurality of circumferentially-spaced-apart slots 12 are moulded in each rib 10, each slot extending transversely across the full width of the rib, substantially normal to the mid-circumferential plane of the tire. Thus the slots 12 in the axially-outermost ribs extend from the groove 11 to the sidewall of the tire (as is clearly shown in FIG. 1) whilst the slots formed in the remaining ribs extend between adjacent grooves to such ribs.

Each slot 12 is of parallel-sided rectangular form in transverse cross-section at and adjacent to the ground-contacting surface of the rib 10 but the remainder of each slot extending radially inwardly from said surface is of a sinuous transverse cross-sectional configuration. Such a configuration defines a plurality of interengaging teeth 13 extending outwardly towards one another of the opposed sidewalls of the slot 12. Each such tooth 13 extends longitudinally of each slot 12 and is of parallel-sided domed configuration each side lying normal to the mid-circumferential plane of the tire.

At the radially-innermost extremity of each slot 12 there is formed an enlarged channel 14 of substantially circular transverse cross-sectional form which also extends across the full width of the rib 10 normal to the mid-circumferential plane of the tire.

In each of the axially-outer ribs (as shown in FIG. 1) the channel 12 is of a greatly enlarged transverse cross-sectional area, as shown at 15, at and adjacent the axially-outer surface 16 of the rib 10, the open mouth of the channel in the axially-outer face of the rib being of substantially straight-sided form and extending from slightly radially inwardly of the base of the channel radially outwardly to a position adjacent the ground-contacting surface of the rib 10.

The slots which are formed in those ribs other than the axially-outermost ones are also formed with an enlarged channel 14 at their radially inner extremities but these channels are not formed with enlarged mouths where they terminate in the grooves 11. One such slot and channel is shown in dotted lines in FIGS. 1 and 2 of the drawing and all of these channels are tapered axially being divergent in the direction of the adjacent sidewall of the tire.

In the modified construction shown in FIG. 3 of the drawings the slots 12 and channels 14 are formed in each rib 10 substantially as described hereinbefore but relative radial movement between the opposed sidewalls of each slot is prevented by means of a plurality of generally diamond-shaped facets 17 formed on each slot sidewall. The facets extend outwardly from one slot sidewall towards, and interengage with, those facets formed on the other slot sidewall.

Those ends of the channels 14 in the axially-outer surface of the axially-outermost ribs are again formed with mouths 15 of greatly enlarged transverse cross-sectional area. In this construction the radially-innermost surface, or base, of the mouth 15 of the channel is formed with a radially outwardly extending projection 18 by means of which water or mud ejected from the channel is deflected radially outwardly of the tire whereby such ejected fluids are not projected onto adjacent vehicles or pedestrians.

In FIG. 4 of the drawings there is shown a further modified construction wherein the slots 12 and channels 14 are again formed in each rib 10 substantially as hereinbefore described. In this construction relative radial movement between the opposed sidewalls of each slot is again substantially prevented by the formation of teeth 13 as is described above with reference to FIGS. 1 and 2.

Those ends of the channels 14 in the axially-outer surface of the axially-outermost ribs are again formed with mouths 15 of greatly enlarged transverse cross-sectional area. However in this construction there is also provided a shoulder safety rib 19 having a suitably shaped axially-inner surface 20 whereby water or mud ejected from the channels is deflected by the surface 20 from a direction axially of the tire to a substantially radially-outward direction. Such a surface 20 may be shaped so as to tend to deflect the ejected water or mud either circumferentially or radially of the tire.

The provision of the slots in the ribs of the tread portion assists in removal of water film from wet road surfaces after the bulk removal of water by the generally circumferential grooves. Both the bulk removal and water film removal stages are assisted by the provision of the channels formed at the radially-innermost extremities of the slots. It will be appreciated that the slots need not extend truly transversely of each rib, that is at 90° to the mid-circumferential plane of the tire. The slots, and associated channels, may for example be inclined at any suitable angle to such plane and the slots in any one rib may be arranged to be inclined in opposite directions to said plane.

However, in all the constructions hereinbefore described, the interengagement between the opposed sidewalls of the slots ensures that substantially no relative movement takes place between such walls of each slot in a direction radially of the tire. Thus excessive heat generation and wear between the opposed sidewalls of the slots is substantially reduced or eliminated.

Having now described my invention, what I claim is:

1. A vehicle tire having a tread portion comprising at least one generally circumferential rib and a generally circumferential groove on at least one side thereof, the rib having a plurality of slots formed therein which extend radially inwardly from the ground-contacting surface of the rib and generally transversely thereof, the opposed sidewalls of each slot being interengaged with one another in such manner that relative movement between said walls is substantially prevented in a direction radially of the tire, in the radially innermost extremities at least some of the slots being of enlarged transverse cross-sectional form to define a channel extending into the groove.

2. A vehicle tire as claimed in claim 1 wherein each of said opposed sidewalls of each slot is provided with one or more projections extending outwardly therefrom, the or each projection on one of said walls being in co-operative engagement with a corresponding projection on the other wall.

3. A vehicle tire as claimed in claim 2 wherein each projection extends the full length of the sidewall of the slot and is formed with substantially parallel side faces for engagement with the side faces of a co-operating projection.

4. A vehicle tire as claimed in claim 3 wherein said parallel side faces lie substantially normal to the mid-circumferential plane of the tire.

5. A vehicle tire as claimed in claim 2 wherein said projections comprises a plurality of facets formed on each of said opposed sidewalls.

6. A vehicle tire as claimed in claim 1 wherein the opposed sidewalls of each slot are bonded together at one or more positions to prevent said relative radial movement between said walls.

7. A vehicle tire as claimed in claim 1 wherein each slot extends across the full width of the rib.

8. A vehicle tire as claimed in claim 1 wherein a plurality of ribs and associated grooves are formed in the tread portion.

9. A vehicle tire as claimed in claim 1 wherein each channel is of tapered form axially thereof and is divergent in the direction of the adjacent sidewall of the tire.

10. A vehicle tire as claimed in claim 8 wherein in each of the axially-outermost ribs, each channel extends at one end to the associated groove and at the other end to the sidewall of the tire.

11. A vehicle tire as claimed in claim 10 wherein that end of the channel which extends to the sidewall of the tire is of a greater transverse cross-sectional area than the remainder of the channel.

12. A vehicle tire as claimed in claim 11 wherein that end of each channel in the sidewall of the tire is so formed as to deflect fluids ejected through the channel away from the axial direction.

13. A vehicle tire as claimed in claim 11 wherein one or more deflecting elements are located axially outwardly of those ends of the channels in the sidewall of the tire to deflect fluids ejected from the channels.

14. A vehicle tire as claimed in claim 13 wherein said elements are so shaped as to tend to deflect ejected fluids circumferentially of the tire.

15. A vehicle tire as claimed in claim 13 wherein said elements are so shaped as to deflect ejected fluids radially of the tire.

16. A vehicle tire as claimed in claim 13 wherein said elements comprise portions of a shoulder safety rib.

References Cited

UNITED STATES PATENTS

| | | | |
|---|---|---|---|
| 1,091,287 | 3/1914 | Cairns | 152—308 |
| 928,611 | 7/1909 | Koneman | 152—308 |
| 2,121,955 | 6/1938 | Eger | 152—209 |
| 2,432,847 | 12/1947 | Woods | 152—209 |
| 3,047,039 | 7/1962 | Fishman | 152—308 |

FOREIGN PATENTS

| | | |
|---|---|---|
| 831,254 | 3/1960 | Great Britain. |

ARTHUR L. LA POINT, Primary Examiner

C. B. LYON, Assistant Examiner

U.S. Cl. X.R.

152—308